United States Patent
Kreft et al.

(10) Patent No.: US 8,688,278 B2
(45) Date of Patent: *Apr. 1, 2014

(54) ECONOMIZER CONTROL

(75) Inventors: Todd Kreft, Richfield, MN (US); Cory Grabinger, Maple Grove, MN (US); Scott McMillan, Golden Valley, MN (US); Paul Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/468,990

(22) Filed: May 10, 2012

(65) Prior Publication Data
US 2012/0283880 A1 Nov. 8, 2012

Related U.S. Application Data

(63) Continuation of application No. 12/686,225, filed on Jan. 12, 2010, now Pat. No. 8,195,335.

(51) Int. Cl.
*G05B 13/00* (2006.01)
(52) U.S. Cl.
USPC .............................. 700/276; 62/186; 454/229
(58) Field of Classification Search
USPC .............................. 700/276; 62/186; 454/229
See application file for complete search history.

(56) References Cited

U.S. PATENT DOCUMENTS

| | | | |
|---|---|---|---|
| 3,979,922 A | 9/1976 | Shavit | |
| 4,182,180 A | 1/1980 | Mott | |
| 4,347,712 A | 9/1982 | Benton et al. | |
| 4,379,484 A | 4/1983 | Lom et al. | |
| 4,423,364 A | 12/1983 | Kompelien et al. | |
| 4,570,448 A | 2/1986 | Smith | |
| 4,580,620 A | 4/1986 | Fukumoto et al. | |
| 4,605,160 A | 8/1986 | Day | |
| 5,276,630 A | 1/1994 | Baldwin et al. | |
| 5,719,408 A | 2/1998 | Yamamoto et al. | |

(Continued)

FOREIGN PATENT DOCUMENTS

| | | | |
|---|---|---|---|
| WO | WO9014556 A1 | 11/1990 | |
| WO | WO2009061293 A1 | 5/2009 | |

OTHER PUBLICATIONS

California Energy Commssion, "2008 Building Energy Efficient Standards for Residential and Nonresidential Buildings," 176 pages, Dec. 2008.

(Continued)

*Primary Examiner* — Mohammad Ali
*Assistant Examiner* — Anthony Whittington
(74) *Attorney, Agent, or Firm* — Seager Tufte & Wickhem LLC.

(57) ABSTRACT

Methods for controlling an economizer of an HVAC system are disclosed. An illustrative control method may include positioning one or more controllable dampers in first and second configurations such that a mixed air stream has first and second mixing ratios of incoming outside air to return air. First and second measures related to the temperature of the mixed air stream may be recorded when the dampers are in each of the first and second configurations. Based on the recorded first and second measures, it may be determined whether and/or how much of the incoming outside air to admit into the economizer via the one or more controllable dampers during subsequent operation of the HVAC system.

20 Claims, 6 Drawing Sheets

(56) References Cited

U.S. PATENT DOCUMENTS

| | | | |
|---|---|---|---|
| 5,762,420 A | 6/1998 | Mills | |
| 5,791,408 A | 8/1998 | Seem | |
| 5,801,940 A | 9/1998 | Russ et al. | |
| 6,006,142 A * | 12/1999 | Seem et al. | 700/276 |
| 6,161,764 A * | 12/2000 | Jatnieks | 236/49.3 |
| 6,223,544 B1 * | 5/2001 | Seem | 62/127 |
| 6,249,100 B1 | 6/2001 | Lange | |
| 6,415,617 B1 * | 7/2002 | Seem | 62/186 |
| 6,609,967 B2 | 8/2003 | Sharp et al. | |
| 6,778,945 B2 | 8/2004 | Chassin et al. | |
| 6,826,920 B2 | 12/2004 | Wacker | |
| 6,988,671 B2 | 1/2006 | DeLuca | |
| 7,099,748 B2 * | 8/2006 | Rayburn | 700/276 |
| 7,434,413 B2 * | 10/2008 | Wruck | 62/126 |
| 8,195,335 B2 | 6/2012 | Kreft et al. | |
| 5,292,280 A1 | 7/2012 | Janu et al. | |
| 2005/0006488 A1 * | 1/2005 | Stanimirovic | 236/49.1 |
| 2005/0278071 A1 * | 12/2005 | Durham, III | 700/276 |
| 2005/0288822 A1 * | 12/2005 | Rayburn | 700/276 |
| 2006/0107670 A1 | 5/2006 | Thomle et al. | |
| 2006/0117769 A1 | 6/2006 | Helt et al. | |
| 2006/0130502 A1 * | 6/2006 | Wruck et al. | 62/186 |
| 2006/0234621 A1 * | 10/2006 | Desrochers et al. | 454/239 |
| 2007/0037507 A1 * | 2/2007 | Liu | 454/229 |
| 2007/0289322 A1 * | 12/2007 | Mathews | 62/225 |
| 2008/0176503 A1 * | 7/2008 | Stanimirovic | 454/229 |
| 2008/0179408 A1 * | 7/2008 | Seem | 236/49.3 |
| 2008/0179409 A1 * | 7/2008 | Seem | 236/49.3 |

OTHER PUBLICATIONS

California Energy Commission, "Reference Appendices for the 2008 Building Energy Efficient Standards for Residential and Nonresidential Buildings," 363 pages, Dec. 2008, revised Jun. 2009.

Carrier Corporation, "Getting More for Less, How Demand Controlled Ventilation Increases Air Quality and Reduces Costs," 7 pages, Dec. 1998.

U.S. Appl. No. 12/764,446, filed Apr. 21, 2010.

U.S. Appl. No. 12/764,415, filed Apr. 21, 2010.

U.S. Appl. No. 12/828,889, filed Jul. 1, 2010.

U.S. Appl. No. 12/764,431, filed Apr. 21, 2010.

FEMP, "Demand-Controlled Ventilation Using CO2 Sensors," Federal Technologies Alert, A New Technology Demonstration Publication, 28 pages, Mar. 2004.

Honeywell, "Building Control Systems, Use of Deman Control Ventilation in Your HVAC system," 1 pageg, Nov. 2005.

Honeywell, "W7212, W7213, W7214 Economizer Logic Modules for Ventilation Control," Product Data, 24 pages, revised Mar. 2010.

Kingrey et al., "Checking Economizer Operation," Washington State University Extension Energy Program, 3 pages, Feb. 6, 2009.

New Buildinfs Institute, "Commercial Rooftop HVAC Energy Saving Research Program, Draft(A) Final Project Report," 99 pages, Mar. 25, 2009.

PurpleSwift, "DC6 AHU Economizer Unit," 2 pages, downloaded Jul. 1, 2010.

Rooftop Systems, Inc., "Economizer Catalog, Version 1.1," 20 pages, downloaded Jul. 1, 2010.

Taylor, "Comparing Economizer Relief Systems," ASHRAE Journal, pp. 33-42, Sep. 2000.

http://content.honeywell.com/building/components/pr/econstudy.asp., "Honeywell Hvac—Economizer Study," 3 pages, printed Oct. 21, 2004.

Honeywell, Fresh Air Economizer(TM) Systems, 2 pages, 1999.

http://www.automatedbuildings.com/releases/mar09/090312111454honeywell.htm, "Honeywell Introduces Economizer Savings Tool and Selectable Dry Bulb Temperature Sensor to Reduce Energy Consumption," 2 pages, Mar. 2009.

http://www.pexsupply.com/Honeywell-W7210A1001-Series-72-Economizer-TwoSPDT . . . , "Series-72-Economizer-TwoSPDT One 2-10VDC," SKU: W7210A1001, 2 pages, printed Sep. 7, 2010.

U.S. Appl. No. 12/890,380, filed Sep. 24, 2010.

U.S. Appl. No. 12/890,396, filed Sep. 24, 2010.

Honeywell, "Product Information Sheet," pp. 134-135, prior to Sep. 24, 2010.

Honeywell, "W6210A,D and W7210A,D Solid State Economizer Logic Module," Product Data, 24 pages, prior to Sep. 24, 2010.

* cited by examiner

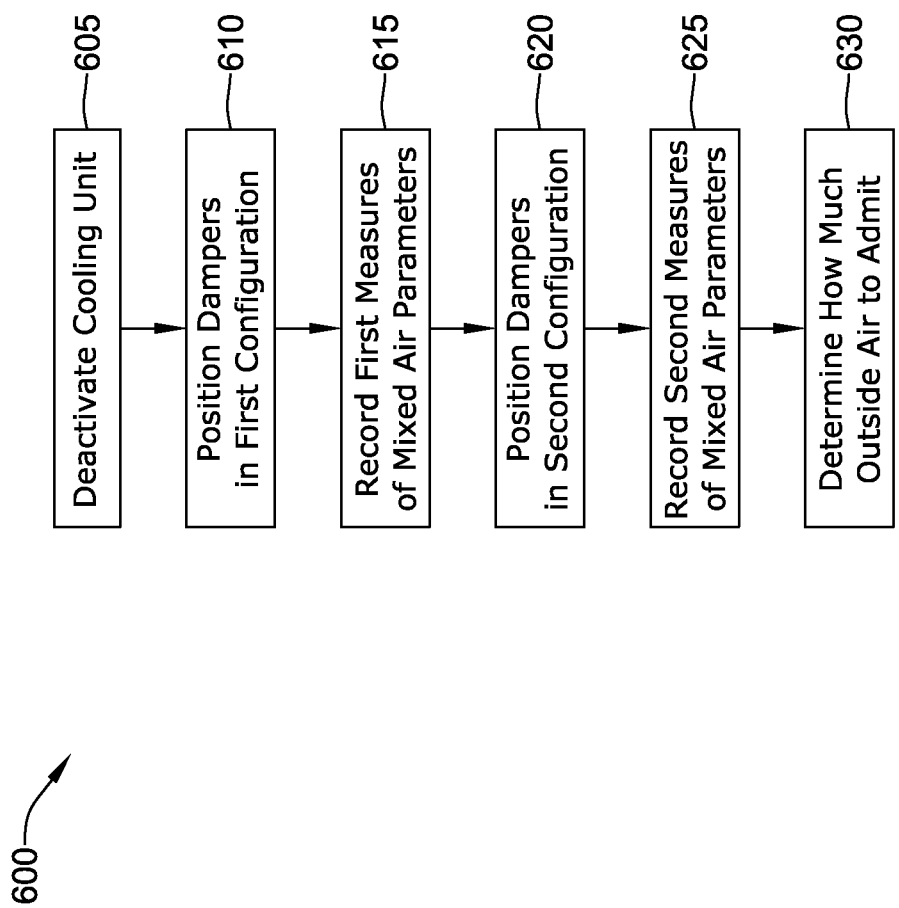

ECONOMIZER CONTROL

This application is a continuation of co-pending U.S. patent application Ser. No. 12/686,225, filed on Jan. 12, 2010, and entitled ECONOMIZER CONTROL, which is incorporated herein by reference.

TECHNICAL FIELD

The disclosure relates generally to Heating, Ventilation, and Air Conditioning (HVAC) systems for conditioning the air of an inside space of a building or other structure, and more particularly, to economizers that are capable of drawing outside air into an HVAC air stream.

BACKGROUND

Most modern buildings use some sort of an HVAC system to control the environment conditions inside of the building. Such HVAC systems can be configured to control a number of different environmental conditions including, for example, temperature, humidity, air quality and/or other environmental conditions, as desired. In many HVAC systems, air from the building's inside space is drawn into return ducts and provided back to the HVAC system, where the return air is conditioned and provided back to the inside space. To meet desired ventilation requirements, some HVAC systems include an exhaust port for exhausting at least some of the return air to the outside environment, and/or an intake port for bringing fresh air into the HVAC system. In some instances, a damper system is provided to control how much return air is exhausted and/or how much outside air is brought into the building. In many instances, the air supplied by the HVAC system to the inside space can be a mixture of fresh outside air and return air, depending on the conditions.

In some HVAC systems, an economizer is provided. The Economizer may, under certain conditions, act as a first stage of cooling to help decrease energy usage of the HVAC system. For example, the economizer may draw in cooler outside air to provide essentially "free" cooling during some cooling cycles. To make good use of an economizer, an HVAC system may benefit from improved economizer control.

SUMMARY

The disclosure relates generally to Heating, Ventilation, and Air Conditioning (HVAC) systems for conditioning the air of an inside space of a building or other structure, and more particularly, to economizers that are capable of drawing outside air into an HVAC air stream.

In an illustrative but non-limiting example, the disclosure provides a method for controlling an economizer of an HVAC system. The economizer has an outside air stream of incoming outside air, a return air stream of return air, and a mixed air stream of mixed incoming outside air and return air that is provided to the cooling unit of the HVAC system. The economizer also includes one or more controllable dampers for controlling a mixing ratio of incoming outside air to return air in the mixed air stream. The control method includes positioning the one or more controllable dampers in first and second configurations such that the mixed air stream has first and second mixing ratios of incoming outside air to return air in the mixed air stream. The method also includes recording first and second measures related to the temperature of the mixed air stream when the dampers are in each of the first and second configurations. First and second measures related to other parameters of the mixed air stream may be recorded as well. Based on the recorded first and second measures related to the temperature of the mixed air stream and possibly other recorded measures related to mixed air stream parameters, the method determines whether and/or how much of the incoming outside air to admit into the economizer via the one or more controllable dampers during subsequent operation of the HVAC system.

The above summary is not intended to describe each and every disclosed illustrative example or every implementation of the disclosure. The Description that follows more particularly exemplifies the various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which:

FIG. 6 is a flow diagram showing another illustrative method of operating an HVAC system that includes an economizer.

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials are illustrated for the various elements, those skilled in the art will recognize that many of the examples provided have suitable alternatives that may be utilized.

Figure 1:
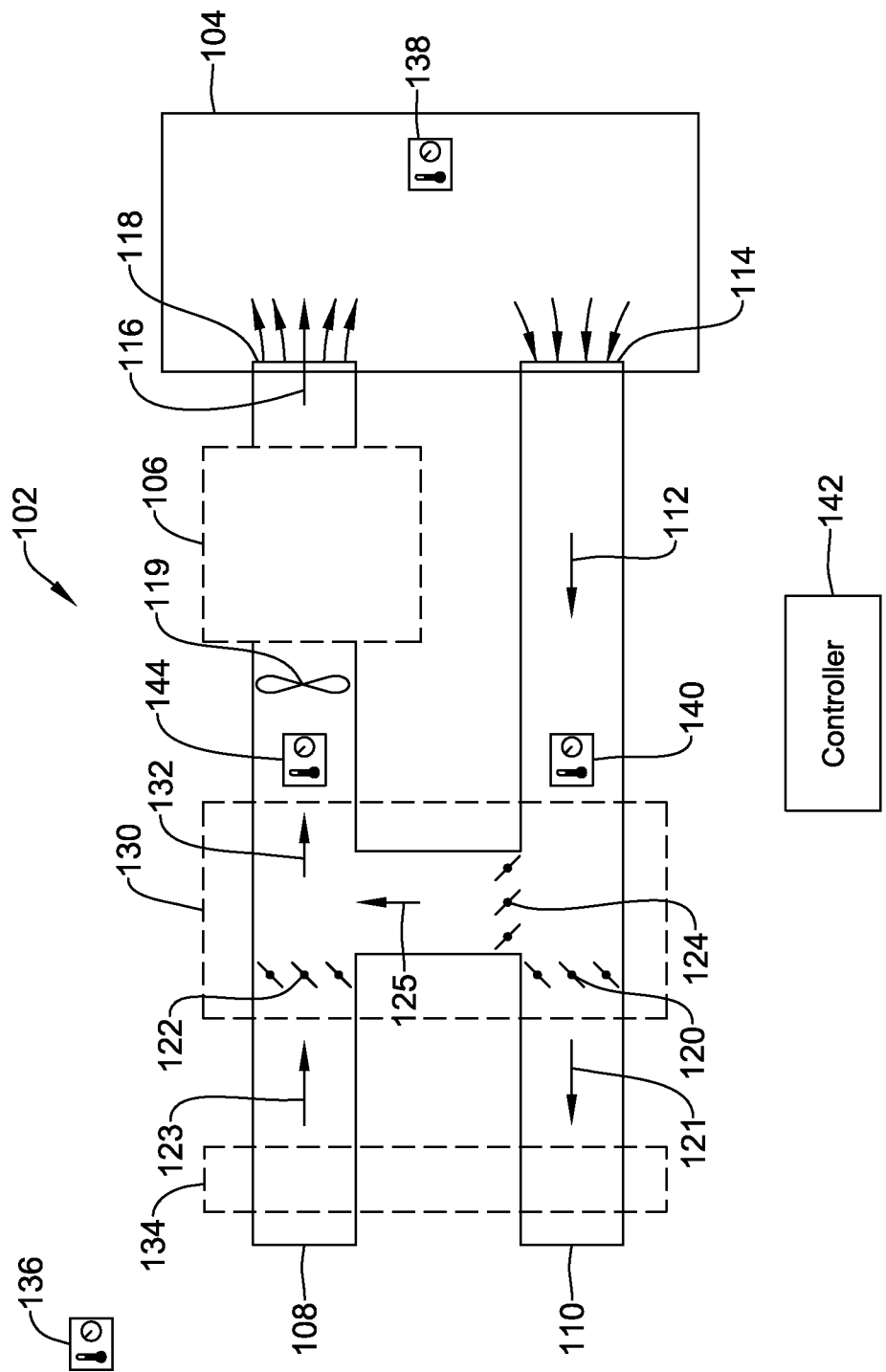
FIG. 1 is a schematic diagram showing an illustrative HVAC system of a building including an economizer.

FIG. 1 is a schematic diagram showing an illustrative HVAC system 102 of a building 104 including an economizer 130. The building 104 may be a residential, commercial, or any other suitable building. The HVAC system 102 may include an HVAC unit 106, which in some cases may include one or more cooling and/or heating units. In the illustrative embodiment shown, the HVAC system 102 includes an economizer 130 upstream of the HVAC unit 106. The economizer 130 may include an outside air intake 108 and/or an exhaust vent 110. A return air stream 112 is shown for drawing return air from the inside space of the building 104 through one or more return registers 114. The illustrative HVAC system 102 includes a fan 119 that can be controlled to induce an air flow through the HVAC unit 106 and to the building 104 as shown at 116 through one or more supply registers 118.

As shown, the economizer 130 of the HVAC system 102 may employ one or more dampers to control air flows, sometimes including an exhaust damper 120 to regulate the fraction of the return air stream 112 that is exhausted 121 from the building 104, an intake damper 122 to regulate the flow of an incoming outside air stream 123 into the building 104, and/or a return damper 124 to regulate the flow of the retained return air stream 125 to mix with the incoming outside air stream 123. In some cases, the dampers 120, 122, and/or 124 may be mechanically coupled to open and close in a coordinated manner, but this is not required. For example, in some illustrative embodiments, dampers 120 and 122 may open and close together or in sequence, and damper 124 may open and close in an opposite manner to dampers 120 and 122. When so provided, when damper 122 is opened to allow more of the outside air stream 123 into the building 104, damper 120 may also open to allow a similar amount of the return air stream 112 to be exhausted 121 from the building 104. The return air damper 124 may close as the dampers 120 and 122 open. This arrangement may help balance the pressure inside the HVAC system 102 and building 104. In some illustrative embodiments, more or fewer of the dampers 120, 122, and 124 may be employed, but the teachings of this disclosure may be applied advantageously to any suitable HVAC system including those that having an economizer 130.

In some illustrative embodiments, the dampers 120, 122, 124 and associated duct work may be included in an economizer unit, such as economizer 130 shown in dashed lines in FIG. 1. Under some conditions, the economizer 130 may be used to provide a first stage of "free" cooling by mixing cooler incoming outside air 123 with the sometimes warmer retained return air 125 to provide a cooler mixed air stream 132 to the cooling coils of the HVAC unit 106. Note that in the present disclosure, "return air" may refer to the return air stream 112, before it has been (possibly) divided into an exhaust air stream 121 and a retained return air stream 125, and in other cases, "return air" or "return air stream" may refer to the retained return air stream, regardless of whether the retained return air stream comprises the entire return air stream 112 or only a fraction thereof. It generally will be clear from context what "return air" refers to, and in the case of referring to the contribution of inside air to the mixed air stream 132, it generally is to be understood that the retained return air stream 125, which originates from the return air stream 112, may be referred to as "return air."

In some instances, the HVAC system 102 may include a heat exchanger generally shown at 134 to transfer heat energy between the incoming outside air stream 123 and the exhausted air stream 121, which may be useful under some operating conditions.

Decisions for when and how to use the economizer 130 may depend on strategies that consider current and/or past conditions of outside air and/or indoor air. The HVAC system 102 of FIG. 1 may include one or more outdoor air sensors 136 for measuring one or more parameters of the outside air. Current economizer strategies are typically based on dry bulb temperature, enthalpy, a combination of the two, or a sensed enthalpy that approximates the two. These strategies generally base a decision to economize (e.g., whether to draw in outside air in amounts greater than those needed to meet ventilation requirements) only on the outside air temperature or enthalpy and whether there is a need to cool the inside space. Generally, they do not include humidity considerations, such as outside humidity and whether there is a need to dehumidify the inside space.

By not considering humidity, a typical current economizer strategy may be overly conservative and base the economization decision by comparing outside conditions to a dry bulb temperature or enthalpy reference value (or "reference") that results in missed economization opportunities. One example of a potential condition that may lead to an overly conservative strategy is that of cool moist outdoor air. Outdoor air that is cooler than the air in the inside space is desirable for cooling, but if it is too moist, it may raise indoor humidity levels to unacceptable levels from the viewpoint of comfort, mold growth, etc. On the other hand, if the indoor air conditions are dry enough, it may be tolerable to take in moist outside air so long as the outside air helps cool the inside without raising the humidity level excessively. Without the benefit of humidity information, a conservative dry bulb temperature and/or enthalpy reference may be established to guard against the former hazard, which then may prevent exploiting the later opportunity.

Another example of a potential condition that may lead to an overly conservative strategy is that of hot dry outdoor air. Conventionally, outside air that is warmer than the inside space is not considered desirable because of the energy required to remove the extra sensible heat from the air, and a conservative references may be established accordingly to minimize its intake. However, when indoor dehumidification is needed, significantly drier outside air, despite being warmer, may actually reduce the energy required by the HVAC system 102 by lowering the latent heat of the inside air. The opportunity to benefit from this latter situation may be lost with a conservative reference intended to prevent intake of warmer air.

In contrast with the current conservative economizer strategies, the present disclosure presents methods of operating HVAC systems 102 with economizers 130 that incorporate strategies that benefit from considering humidity conditions, and whether indoor dehumidification is needed or not. These strategies, methods, and devices may beneficially expand the range of conditions under which economizers may be employed, which may result in more efficient and/or more effective HVAC system operation.

The HVAC system of FIG. 1 may include one or more inside air sensors 138 for measuring one or more parameters of the air of the inside space of the building 104. Alternatively, or in addition, one or more return air stream sensors 140 may be provided to measure parameters of the air of the inside space, given that the return air stream 112 is drawn from the inside space of the building 104. Any of inside 138, return 140, and outside 136 sensors may be configured to determine one or more air parameters of interest, such as dry bulb temperature, wet bulb temperature, dew point (i.e., dew point temperature), relative humidity, and/or enthalpy (i.e., specific enthalpy), to name a few. Notably, these air parameters are not all independent. With appropriate assumptions (e.g., ideal gases, etc.), their interrelationship may be expressed through psychrometric equations and represented graphically, for example on a psychrometric chart, or numerically as desired. Some desired air parameters may be obtained from measurements of two other appropriately chosen air parameters. For example, dew point and/or enthalpy may be calculated from measured values of dry bulb temperature and relative humidity. In some illustrative embodiments, any of inside 138, return 140, and/or outside 136 sensors may be configured to measure or determine two or more air parameters selected from a set of parameters such as dry bulb temperature, dew point, relative humidity, and/or enthalpy.

A controller, such as controller 142, may be provided to control the HVAC system 102. Controller 142 may be any suitable controller. It may be a controller for the entire HVAC system 102, or any appropriate subset or subsets of the HVAC system 102 such as the economizer 130. Physically, it may be a stand-alone unit or units, or it may be integrated with hardware, such as economizer 130. Controller 142 may be configured to receive information from any suitable source, such as the inside 138, return 140, and/or outside 136 sensors, and it may be configured to issue commands to any appropriate component of the HVAC system 102, such as dampers 120, 122, 124, HVAC unit 106, etc. Controller 142 may be configured and programmed in any suitable manner.

In some illustrative methods of operating an HVAC system, such as the HVAC system 102 of FIG. 1 or any other suitable HVAC system, a determination may be made whether dehumidification of the inside space of the building 104 is desired, and depending on whether dehumidification is desired (or not), the economizer 130 may be operated in different manners. Whether dehumidification is desired may be determined in any suitable way. For example, generally speaking, to make a dehumidification decision, one or more inside air parameter may be considered. In one example, the criterion may include comparing the inside air dew point with a dew point setpoint, and dehumidification may be desired when the inside air dew point exceeded the dew point setpoint and not desired when the dew point setpoint exceeded the inside air dew point. In another example, the criterion may include comparing the inside air relative humidity with a relative humidity setpoint. Dehumidification may be desired when the inside air relative humidity exceeded the relative humidity setpoint, and not desired when the relative humidity setpoint exceeded the inside air relative humidity. These exemplary criteria should not be considered exclusive or limiting in any way. In some cases, a dehumidification determination might include a dew point criterion in one dry bulb temperature range, and a relative humidity criterion in another dry bulb temperature range. These or other inside air parameters, or combinations thereof, may also be considered. In many instances, determining whether dehumidification of the inside space is desired may be based on one or more of the inside air dry bulb temperature, the inside air dew point, the inside air relative humidity, and/or the inside air enthalpy.

Figure 2:
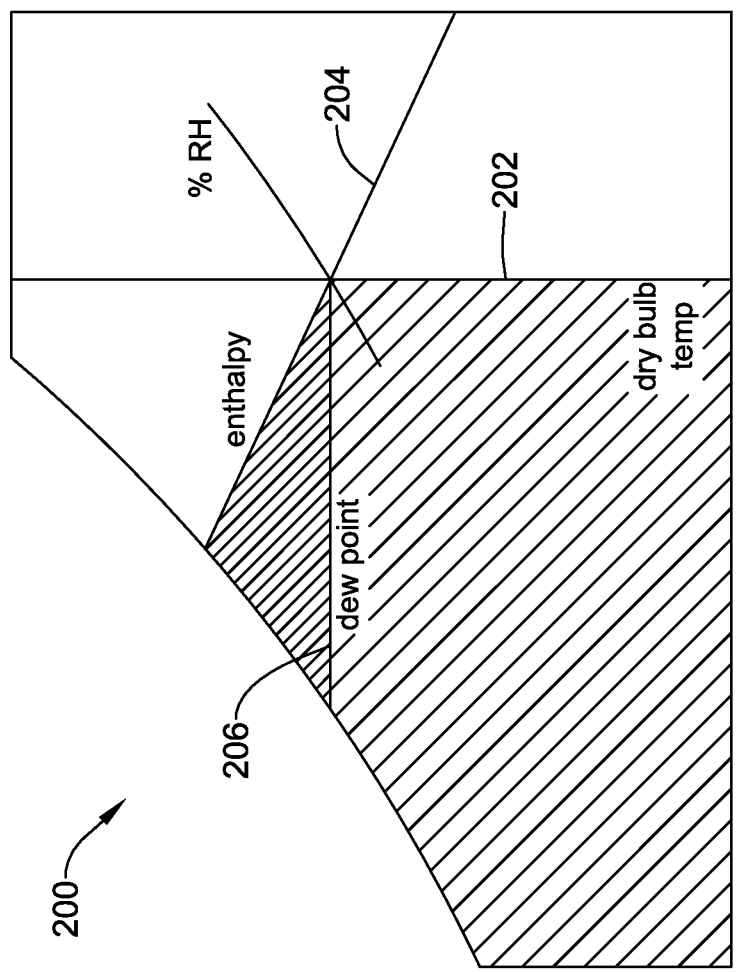
FIG. 2 is a schematic psychrometric chart showing conditions that can be used to control the economizer of FIG. 1 when dehumidification in the inside space is not desired.

When dehumidification is not desired, some illustrative methods may compare outside air parameters to reference values, or references, to determine appropriate operation of the economizer 130. Illustrative references (e.g. reference values) are discussed further elsewhere herein. FIG. 2 is a schematic psychrometric chart 200 showing conditions or criterion that can be used when controlling the economizer 130 of FIG. 1 when dehumidification is not desired. In the example shown, and when dehumidification is not desired, if the outside air dry bulb temperature is less than a dry bulb temperature reference (that is, to the left of dry bulb temperature reference line 202), and if the outside air enthalpy is less than an enthalpy reference (that is, below enthalpy reference line 204), then the economizer 130 may be commanded by the controller 142 to increase the intake of outside air via damper 122 into the HVAC unit 106. On psychrometric chart 200, the hatched region indicates this portion of outdoor air parameter space. Note that the hatched region included a doubly-hatched roughly wedge-shaped portion above the constant dew point line 206. Constant dew point line 206 may represent a dew point reference, setpoint, and/or inside value. This wedge-shaped portion corresponds to a part of outdoor air parameter space that conventionally might be considered too humid for economization. However in the present scenario, it is considered desirable to intake this outside air (i.e., it is below the enthalpy reference). When dehumidification is not desired, the introduction of additional humidity to the air of the inside space of the building 104 may be considered acceptable.

A command to increase the intake of outside air may be executed, for example, by adjusting one or more of the dampers 120, 122, 124 to increase the fraction of the incoming outside airstream 123 making up the mixed air stream 132 (i.e., HVAC air stream) of FIG. 1. Such adjustment may entail opening, further opening, maximally opening, or entirely opening one or more of dampers 120 and 122, and also may entail closing, partially closing, maximally closing, or entirely closing damper 124. The intake of outside air into the HVAC airstream may be increased to any suitable degree, as desired. In the example shown in FIG. 2, if the outdoor air parameters fall outside the hatched region of parameter space when dehumidification is not desired—that is, if either the outside air dry bulb temperature is greater than the dry bulb temperature reference or the outside air enthalpy is greater than the enthalpy reference—then the economizer 130 may be commanded to minimize the intake of outside air into the HVAC air stream. The command to minimize intake of outside air may be executed, for example, by adjusting one or more of the dampers 120, 122, 124 to minimize the fraction of the incoming outside airstream 123 making up the mixed air stream 132. In some cases, the intake of outside air into the HVAC airstream may be essentially entirely prevented. In other cases, a minimized intake of outside air may be maintained, for example, to satisfy certain fresh air ventilation requirements or desires.

References, or reference values, may be established, set, defined, or otherwise determined in any suitable manner, for any appropriate reason. In some illustrative embodiments, the dry bulb temperature reference may correspond to a dry bulb temperature setpoint, and an enthalpy reference may correspond to an enthalpy setpoint. In some cases, the enthalpy reference may not correspond directly to an enthalpy setpoint, but may instead depend at least in part on a dry bulb temperature setpoint and a relative humidity setpoint. In some illustrative embodiments, one or more of the setpoints may be setpoints for inside air parameters that the HVAC system is intended to maintain or attempt to maintain.

Basing economization decisions on fixed references, such as dry bulb temperature and enthalpy references, may result in an economizer increasing the intake of outside air when it has been determined to be favorable to do so. For example, in the example shown in FIG. 2, when the dry bulb temperature and enthalpy references take the values of the dry bulb temperature and enthalpy setpoints for inside air that the HVAC system is intended to maintain, then the economizer 130 may be commanded to increase the intake of outside air when the outside air is at the desired inside dry bulb temperature, or cooler, and has the desired inside enthalpy, or lower. However, while using the example shown in FIG. 2 with such references represents a significant improvement over conventional economizer strategies that do not consider humidity, further improvements in economizer utilization are still possible. In particular, improvements in economizer utilization may be achieved by, for example, adopting differential economizer strategies that compare outside air parameters with inside air parameters, and base economizer decisions, at least in part, on the difference(s) between outside and inside conditions rather than particular set points.

In a differential economizer strategy, outside air parameters may be compared with references based upon current indoor air parameters, rather than fixed references. In some illustrative embodiments, either or both of the dry bulb temperature reference and the enthalpy reference may depend upon the inside air dry bulb temperature and the inside air enthalpy, respectively.

In some illustrative embodiments, either or both of the dry bulb temperature reference and the enthalpy reference may have the values of the inside air dry bulb temperature and the inside air enthalpy, respectively. When the dry bulb temperature reference corresponds to the inside air dry bulb temperature, and the enthalpy reference corresponds to the inside air enthalpy, the hatched portion of the psychrometric chart of FIG. 2 may correspond to outside air that, if exchanged with air of the inside space, generally will desirably reduce the temperature and/or enthalpy of the newly resulting inside air mixture. Similarly, such outside air, when drawn into incoming outside air stream 123 and mixed with retained return air stream 125 drawn from the inside space of the building 104, desirably results in lower dry bulb temperature and/or enthalpy for mixed air stream 132 relative to the dry bulb temperature and enthalpy of the return air stream alone (or at least, neither of those parameters are made greater by the mixing of the outside air stream with the return air stream).

By comparing outside air parameters with actual inside air parameters in a differential strategy, an economizer decision to increase the intake of outside air may be made even when there is a smaller advantage to doing so, in contrast to the case of fixed references, where it may be necessary for the advantage to rise above a more sizable threshold before economization may be invoked. Another possible situation that a differential strategy may be able to exploit advantageously over a fix reference strategy is when inside air set points are varied according to a schedule, such as one intended to save energy according to the occupied or unoccupied schedule for a building. Air unavailable for free cooling during an occupied period with a lower inside dry bulb temperature may be useable for free cooling during an unoccupied, higher dry bulb temperature period. These situations may represent significant advantages for differential economizer strategies.

Figure 3:
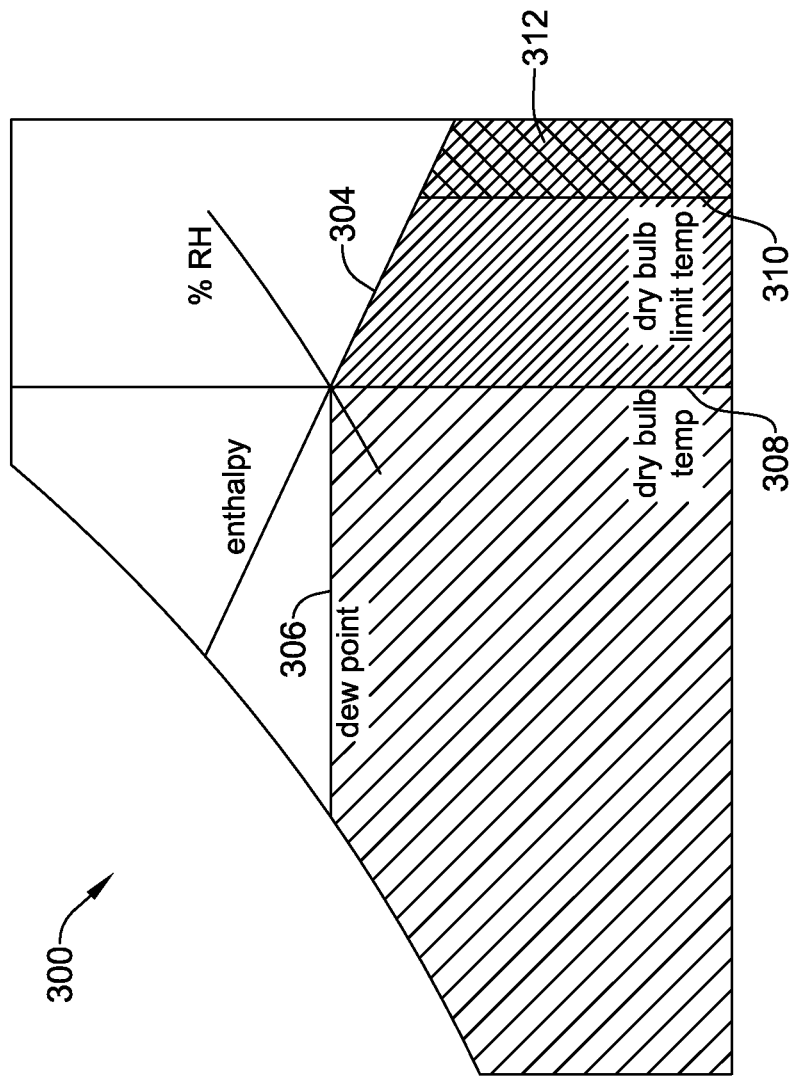
FIG. 3 is a schematic psychrometric chart showing conditions that can be used to control the economizer of FIG. 1 when dehumidification in the inside space is desired.

Turning now to FIG. 3, which is a schematic psychrometric chart showing conditions that can be used to control the economizer 130 of FIG. 1 when dehumidification in the inside space is desired. In the illustrative chart, if the outside air enthalpy is less than an enthalpy reference (that is, below enthalpy reference line 304 in FIG. 3), and if the outside air dew point is less than a dew point reference (that is, below dew point reference line 306 in FIG. 3), then the economizer 130 may be commanded to increase the intake of outside air into the HVAC air stream. On psychrometric chart 300, the hatched region indicates this portion of outdoor air parameter space. Note that the hatched region included a doubly-hatched portion to the right of the constant dry bulb temperature line 308. Constant dry bulb temperature line 308 may represent a dry bulb temperature reference, setpoint, and/or inside value. This doubly-hatched portion corresponds to a part of outdoor air parameter space that conventionally might be considered too hot for economization. However, when it is determined that dehumidification is desired, it may be energetically desirable to intake this outside air (i.e., it is below the enthalpy reference). The greater dry bulb temperature of this hotter outside dry air may be considered acceptable because of the benefit of dehumidification resulting from mixing the dry outside air with the more humid air of the inside space. In some illustrative embodiments, a dry bulb temperature limit (e.g. corresponding to line 310) may set an upper boundary for economizer operation, such that the additional condition of outside dry bulb temperature must be below the limit before economizer operation is initiated or maintained. The cross-hatched region 312 of psychrometric chart 300 indicates the portion of outdoor air parameter space where economization may accordingly be curtailed.

A command to increase the intake of outside air may be executed by, for example, adjusting one or more of the dampers 120, 122, 124, as discussed in greater detail elsewhere herein. The intake of outside air into the HVAC airstream may be increased to any suitable degree, and may depend on any appropriate considerations. For example, it may be desired to control the increased intake of hot dry outside air such that the mixed air stream 132 dry bulb temperature falls within the capability of HVAC unit 106 to be cooled to a specified dry bulb temperature before being supplied as conditioned air 116 to the inside space of building 104. In some illustrative embodiments, such a specified dry bulb temperature may be equal to or less than the inside dry bulb temperature.

If outdoor air parameters fall outside the hatched region of parameter space when dehumidification is needed—that is, if either the outside air enthalpy is greater than the enthalpy reference or the outside air dew point is greater than the dew point reference—then the economizer 130 may be commanded to minimize the intake of outside air into the HVAC air stream. The command to minimize intake of outside air may be executed, for example, by adjusting one or more of the dampers 120, 122, 124, as discussed in greater detail elsewhere herein. As also mentioned elsewhere herein, economization may be curtailed or minimized when the outside dry bulb temperature exceeds a dry bulb temperature limit, if desired.

Similarly to how other references may be established, set, defined, or otherwise determined, the dew point reference may be a dew point setpoint, or it may be an inside air dew point value. A differential economizer strategy may be employed here as well as in the case of when dehumidification is not needed. When the dew point reference corresponds to the inside air dew point, and the enthalpy reference corresponds to the inside air enthalpy, the hatched portion of the psychrometric chart of FIG. 3 may correspond to outside air that, if exchanged with air of the inside space, generally will desirably reduce the dew point and/or enthalpy of the newly resulting inside air mixture. Similarly, such outside air, when drawn into incoming outside air stream 123 and mixed with retained return air stream 125 drawn from the inside space of the building 104, desirably results in lower dew point and/or enthalpy for mixed air stream 132 than the dew point and enthalpy of the return air stream alone (or at least, neither of those parameters are made greater by the mixing of the outside air stream with the return air stream).

Figure 4:
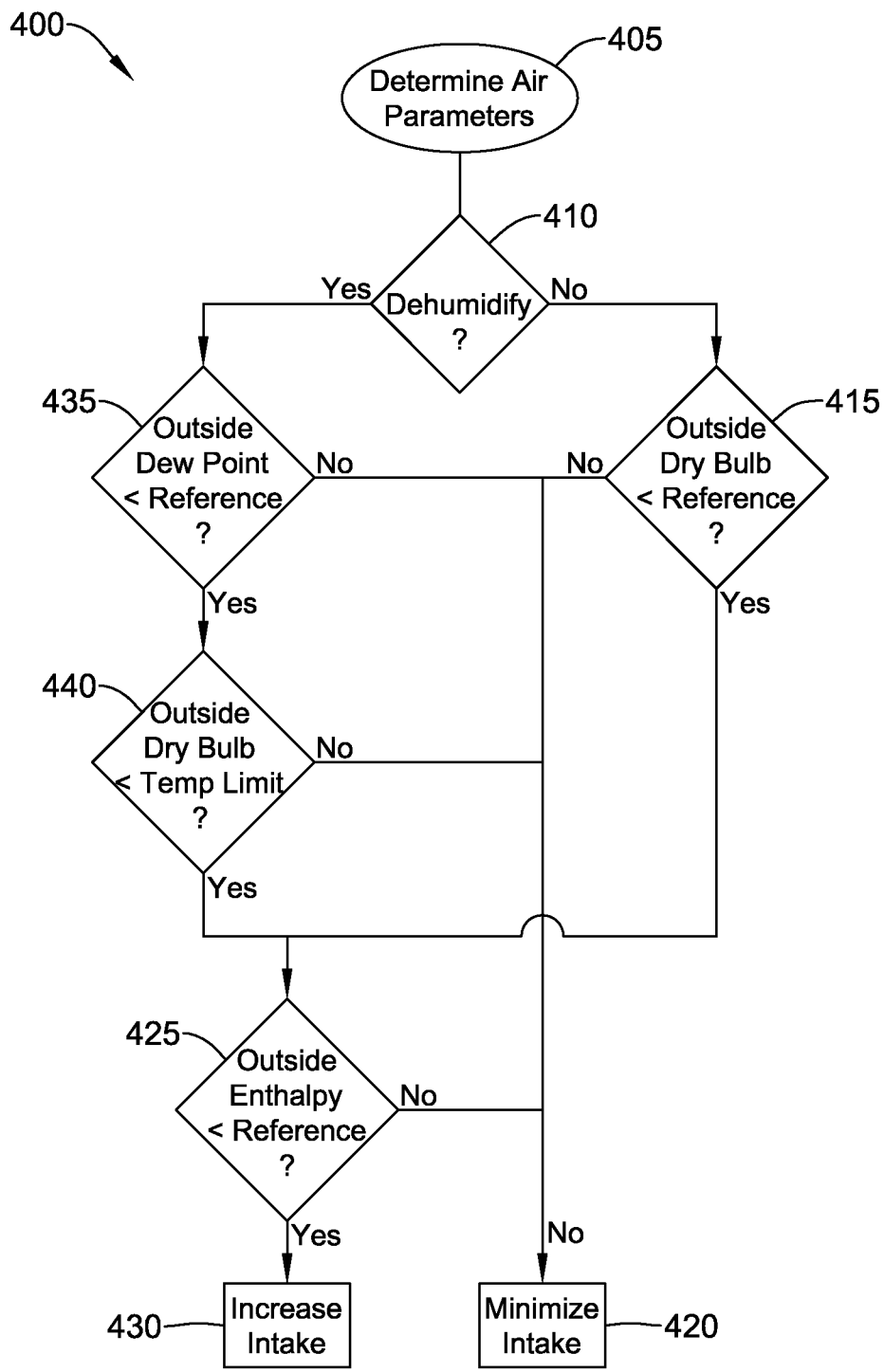
FIG. 4 is a flow diagram showing an illustrative method of operating an HVAC system that includes an economizer.

FIG. 4 is a flowchart of an illustrative method 400 of operating an HVAC system 102 having an economizer 130 that incorporates economizer strategies such as those discussed in conjunction with FIGS. 2 and 3. The HVAC system may be the HVAC system of FIG. 1, or any other suitable HVAC system having an economizer. The illustrative method 400 includes determining appropriate outside and/or inside air parameters at block 405, such as dry bulb temperature, wet bulb temperature, dew point, relative humidity, and/or enthalpy. As discussed further herein, parameters may be measured directly, or determined by calculation or other methods from directly measured parameters. At block 410, a determination is made whether dehumidification of air of the inside space is needed or not, as discussed further herein. If dehumidification is not needed, the illustrative method 400 proceeds to block 415, where the outside dry bulb temperature is compared to a dry bulb temperature reference. If the outside dry bulb temperature is not less than the dry bulb temperature reference, the illustrative method 400 proceeds to minimizing intake of outside air by the economizer at block 420. If the outside dry bulb temperature is less than the dry bulb temperature reference, the illustrative method 400 proceeds to block 425, where the outside enthalpy is compared to an enthalpy reference. If the outside enthalpy is not less than the enthalpy reference, the illustrative method 400 proceeds to minimizing intake of outside air by the economizer at block 420. If the outside enthalpy is less than the enthalpy reference, the illustrative method 400 proceeds to increasing intake of outside air by the economizer at block 430.

Returning to the dehumidification determination at 410, if dehumidification is needed, the illustrative method 400 proceeds to block 435, where the outside dew point is compared to a dew point reference. If the outside dew point is not less than the dew point reference, the illustrative method 400 proceeds to minimizing intake of outside air by the economizer at block 420. If the outside dew point is less than the dew point reference, the illustrative method 400 proceeds to block 440, where the outside dry bulb temperature is compared to a dry bulb temperature limit. If the outside dry bulb temperature is not less than the dry bulb temperature limit, the illustrative method 400 proceeds to minimizing intake of outside air by the economizer at block 420. If the outside dry bulb temperature is less than the dry bulb temperature limit, the illustrative method 400 proceeds to block 425, where the outside enthalpy is compared to the enthalpy reference, as discussed already, and from block 425 proceeds either to minimizing intake at block 420 or increasing intake at block 430.

A number of methods of the present disclosure for operating HVAC systems having economizers consider outside and inside air parameters when making economization decisions, as discussed herein. Obtaining usable data on outside and inside air parameters, therefore, may significantly contribute to the ability to practice these methods. In some illustrative embodiments, inside 138, return 140, and outside 136 sensors, as illustrated in FIG. 1, may be used to provide such data. In some instances, however, any one or more of the aforementioned sensors or sets of sensors may not be included in an HVAC system for any number of reasons, including cost, difficulty of installation, and lack of understanding of the advantages provided by the data determined by the sensors. The present disclosure provides new options for air parameter data collection that have a number of advantages, including but not limited to, in some instances, simpler and potentially lower cost installation, and in some cases, simplified interpretation of data.

In some illustrative embodiments, one or more mixed air stream parameters are provided by one or more mixed air stream sensors 144. Data provided by the one or more mixed air stream sensors 144 may be used for economizer control. In some cases, the data from mixed air stream sensors 144 may be used in addition to, or in the absence of, data from one or more air parameter sensors such as inside 138, return 140, and outside 136 sets of sensors. In some illustrative embodiments, one or more mixed air stream sensors 144 may provide the only data for air parameters in an HVAC system. In some illustrative embodiments, mixed air stream sensors 144 may provide data on air parameters as an alternative or backup for absent or questionable data from damaged, missing, failed, or otherwise unusable sensors. Mixed air stream sensors may be installed at the time of manufacture by an HVAC equipment manufacturer, as compared to sensors such as outside air sensors that may need to be installed in the field at the time of system installation. HVAC systems including mixed air stream sensors and methods of controlling or operating such systems are discussed further herein.

In relation to FIG. 1, one or more mixed air stream sensors 144 may measure air parameters of mixed air stream 132, which may be a mixture of incoming outside air 123 and retained return air 125. Preferably, the incoming outside air 123 and retained return air 125 are adequately mixed by the time they reach the one or more mixed air stream sensors 144 such that mixing equations can be used to relate the measureable mixed air stream parameters to the parameters of the incoming outside air stream and/or the parameters of the retained return air stream (which may reflect the parameters of the air of the inside space). In some illustrative embodiments, and as shown in FIG. 1, mixed air sensors 144 may be placed in a mixing chamber of the economizer 130, at or around the region where incoming outside air stream 123 and retained return air stream 125 meet. Any suitable structures may be used to promote mixing of the air streams. In some illustrative embodiments, one or more mixed air sensors may be placed downstream of the economizer but preferably upstream of the HVAC unit 106. However, in some illustrative embodiments, one or more mixed air sensors may be placed after the HVAC unit 106. At such a location, the sensors may sample conditioned air stream 116 when HVAC unit 106 is affecting air parameters. If HVAC unit 106 is inactive, parameters of the air exiting the HVAC unit 106 may be essentially unchanged from parameters of the mixed air stream 132 entering the unit, and sensors so located may essentially measure parameters of the mixed air stream. In the present disclosure, it is to be assumed that mixed air sensors 144 measure parameters of the mixed air stream 132 unaffected by HVAC unit 106 unless otherwise noted.

In some embodiments, one or more of the dampers 120, 122, 124 may be positioned so that the mixed air stream 132 includes essentially none of retained return air stream 125, such that the mixed air stream may then essentially be composed entirely of incoming outside air 123. In such a configuration, mixed air sensors 144 may be used to measure parameters of the incoming outside air stream 123, potentially obviating, in whole or in part, the need for outside air sensors 136. Alternately, it may be possible to configure the dampers 120, 122, 124 so that the mixed air stream 132 includes essentially none of incoming outside air stream 123, such that the mixed air stream may then essentially be composed entirely of retained return air stream 125. In such a configuration, mixed air sensors 144 may be used essentially to measure parameters of the retained return air stream 125, potentially obviating, in whole or in part, the need for return air sensors 140 and/or inside air sensors 138. In some illustrative embodiments, dampers 120, 122, 124 may be temporarily configured in one or the other of these configurations (i.e., such that mixed air stream 132 is essentially composed entirely of incoming outside air stream 123 or return air stream 125) to effectively allow measurement of outside or inside air conditions with the one or more mixed air sensors 144.

Figure 5:
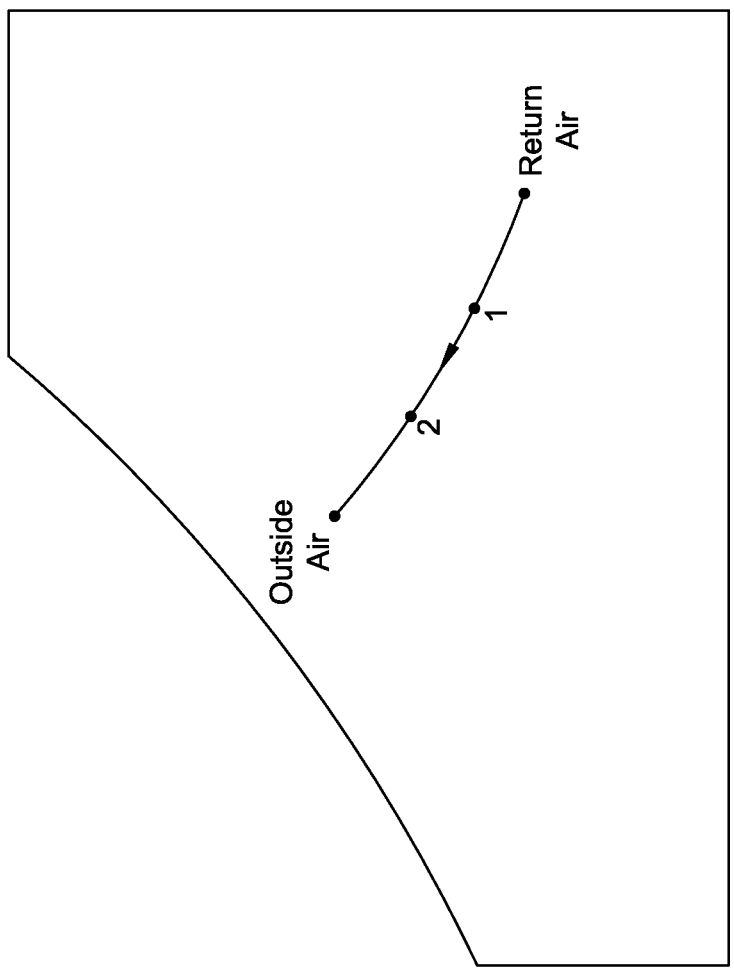
FIG. 5 is a schematic psychrometric chart showing an example relationship between outside air, return air, and mixed air parameters in two economizer configurations.

In general, the configuration of dampers 120, 122, 124 may result in a mixed air stream 132 that may include any arbitrary achievable mixing ratio of incoming outside air stream 123 and retained return air stream 125. FIG. 5 is a schematic psychrometric chart showing an example relationship between outside air, return air, and mixed air parameters in two economizer configurations. In this example, the outside air has a lower dry bulb temperature than the return air, and also is more humid, with both a higher dew point and a greater relative humidity. Points 1 and 2 represent mixed air parameters (measurable by mixed air sensors) in each of two different economizer configurations where two different damper configurations result in two different mixing ratios of outside and return air. In configuration 2, the mixed air includes a greater proportion of outside air as compared to configuration 1, and hence, point 2 is closer to the outside air point than is point 1, and point 1 is closer to the return air point than is point 2. Note that the line between the return air point and the outside air point on the psychrometric chart is merely schematic. As the outside/return proportion of the mixed air varies between fully return air and fully outside air, the mixed air parameters may or may not vary along a linear path in psychrometric parameter space. However, the parameters may vary in a manner predictable by mixing equations. The arrow in FIG. 5 represent the direction of change in parameters as the economizer/dampers vary from configuration 1 to 2.

In situations when dampers 120, 122, 124 are configured such that the mixed air stream 132 is composed of a mixture of incoming outside air stream 123 and return air stream 112 (and not essentially one or the other exclusively), it may be possible to use mixing equations to determine one or more parameters of air that is not directly sampled by any sensors by interpreting one or more air parameters determined from the mixed air sensors 144 along with other information such as damper position. In one example, the inside dry bulb temperature may already be known (by any means, for example, from inside air sensors 138, return air sensors 140, or from mixed air sensors 144 at a different time when the mixed air stream 132 is essentially composed entirely of retained return air stream 125). The mixed air dry bulb temperature may be measured by one or more mixed air sensors 144, and the mixing ratio of the incoming outside air stream 123 to the retained return air stream 125 may be known by, for example, the current damper positions. With this information, the outside air dry bulb temperature may be calculated from mixing equations. While dry bulb temperature was used in this example, other parameters or combinations of parameters may be used.

In another example, mixed air dry bulb temperature and relative humidity may be measured in both of a first and second damper configuration, for example, corresponding to points 1 and 2 of FIG. 5. With the six known quantities of first temperature, first humidity, first mixing ratio, second temperature, second humidity, and second mixing ratio, the mixing equations may be solved for both inside and outside dry bulb temperature and dew point (or relative humidity, or enthalpy, via the psychrometric relationships).

Knowledge of mixing ratios may be obtained in any appropriate way. For example, mixing ratios may be related to known damper positions through calculations or lookup tables, which may be based upon theoretical analysis or prior empirical measurement under a variety of conditions. Pressure and/or air flow measurements in different air streams may be considered as well.

FIG. 6 is a flow diagram showing another illustrative method of operating an HVAC system that includes an economizer, where the method includes measuring parameters of a mixed air stream. The method is described here in relation the HVAC system of FIG. 1, but it may be practiced with any suitable HVAC system having an economizer. At block 605, the cooling unit of HVAC unit 106 of the HVAC system 102 may be deactivated. In some illustrative methods, the HVAC unit 106 may be or remain deactivated during mixed air parameter measurements. In some illustrative methods, the HVAC unit 106 may not be deactivated. In any event, at block 610, one or more controllable dampers 120, 122, 124 of the economizer 130 may be positioned in a first known configuration such that the mixed air stream 132 has a first mixing ratio of incoming outside air 123 to return air 125 in the mixed air stream. In some illustrative embodiments, positioning the controllable dampers in a first configuration may include retaining the initial positions of the dampers at the start of the method. At block 615, one or more first measures may be taken of parameters of the mixed air stream 132, which may include measures of dry bulb temperature, humidity, enthalpy, and/or any other suitable measures, and such measures may be recorded. At block 620, one or more controllable dampers 120, 122, 124 of the economizer may be re-positioned in a second known configuration such that the mixed air stream 132 has a second mixing ratio of incoming outside air 123 to return air 125 in the mixed air stream, with the second mixing ratio being different from the first mixing ratio. In some illustrative embodiments, the second mixing ratio may be greater or less than the first mixing ratio. At block 625, one or more second measures may be taken and recorded of parameters of the mixed air stream 132. After first and second measures of mixed air stream parameters have been taken, the illustrative method may determine at block 630 whether outside air usage by the economizer is desirable, and/or whether and/or how much of the incoming outside air to admit into the economizer 130 via the one or more controllable dampers 120, 122, 124 during subsequent operations of the HVAC system 102, based at least in part upon the recorded first and second measures.

The determining step at block 630 may be carried out in any appropriate way, and may include considering any appropriate criteria, including those discussed herein in relation to FIGS. 2, 3, and 4. The determining step at block 630 may include determining any appropriate parameters of outside air, inside air, etc., from the first and second measures of the mixed air stream recorded at blocks 615 and 625, or determinations of such air parameters from recorded mixed air stream measures may be carried out in another step of method 600, with the determined air parameters then being considered in the determining step. For example, any of outside dry bulb temperature, dew point, entropy, or any other parameter of the incoming outside air stream may be determined, as well as inside/return air dry bulb temperature, dew point, entropy, relative humidity, or any other parameter of the return air stream may be determined.

In some illustrative examples, the determining block 630 may be based upon first and second measures related to the temperature of the mixed air stream. In some illustrative examples, the determining block 630 may be based upon first and second measures related to the humidity of the mixed air stream, either in combination with measures related to temperature or without consideration of temperature measures.

In some illustrative examples, the determining step 630 may be based upon measures of mixed air parameters without necessarily determining outside, return, and/or inside air parameters. For example, as discussed elsewhere herein in relation to differential economization strategies in situations when dehumidification is not needed, if the outside air has a lower dry bulb temperature and/or enthalpy than the inside/return air, then economization may be considered desirable, as increased intake of outside air into the mixed air stream desirably results in lower dry bulb temperature and enthalpy for the mixed air stream compared to a mixed air stream having a lesser intake of outside air into the mixed air stream. Thus, in some illustrative embodiments, when dehumidification is not needed, determining block 630 may essentially incorporate these observations about mixed air parameters. If, at block 620, the dampers are positioned to increase the mixing ratio of incoming outside air to return air, and the second measures reflect lower dry bulb temperature and enthalpy for the mixed air stream than do the first measures, then the determining block 630 may indicate economizer usage as desirable and may call for increased admission of outside air into the economizer during subsequent HVAC system operation.

Analogous criteria may be applied when, at block 620, the dampers are positioned to decrease the mixing ratio. In that case, the first mixing ratio would reflect a greater proportion of outside air compared to the second mixing ratio, and the determining block 630 may call for increased admission of outside air into the economizer during subsequent HVAC system operation if the second measures reflect higher dry bulb temperature and enthalpy for the mixed air stream than do the first measures. In some illustrative embodiments, the differences between dry bulb temperatures and/or enthalpies of the first and second measures may be required to exceed threshold temperature and/or enthalpy differences for economizer usage to be indicated as being desirable. If any of the dry bulb temperature or enthalpy conditions are not met, then economizer usage may be indicated as not desirable.

In some illustrative embodiments, analogous considerations may apply when dehumidification is needed, with, for example, determinations of the desirability or not of economizer usage based upon differences (possibly requiring such differences to exceed thresholds) in dew point and/or entropy of a mixed air stream when dampers are adjusted from first to second configurations, with attendant changes in first and second mixing ratios.

Measurement of mixed air properties may allow economizer strategies to incorporate more finely-tuned control of mixing of incoming outside air and return air. For example, as discussed elsewhere herein, when dehumidification is not needed, cooler but more humid outside air may be taken into the mixed airstream to provide free cooling, despite the resulting increase in inside humidity. (See, for example, the discussion of the doubled-hatched region of FIG. 2.) Mixed air sensors may provide real-time feedback of mixed air parameters to allow control of dampers to modify the amount of outside air intake such that the resulting mixed air has parameters that fall within acceptable or otherwise defined ranges. Similar considerations may apply when using hot, dry air for dehumidification, as discussed herein. Furthermore, if mixed air sensors are placed downstream of an active cooling or other HVAC unit, they may be used to monitor conditioned mixed air and provide more complete feedback to a controller about HVAC system performance.

The present disclosure provides a number of illustrative methods of controlling HVAC systems and/or economizer, assessing the suitability of using outside air in an economizer, and so on. These methods may consider parameters of air such as outside, inside, return, and mixed air, and base economizer operations, etc., on those parameters. As various air parameters both outside and inside are subject to change over time, it may be desirable to repeat steps of the methods disclosed herein from time to time, so that, for example, economization decisions can be made with the benefit of recent data. In some illustrative embodiments, air parameter determinations and economization decisions may be performed at regular time intervals. In some illustrative embodiments, air parameter determinations and economization decisions may be performed before, during, or otherwise as part of each response of an HVAC system to a call for cooling and/or dehumidification.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A controller unit for an economizer unit of an HVAC system, wherein the economizer unit is configured to provide an air stream to a cooling and/or heating unit, the economizer unit having an outside air stream of incoming outside air, a return air stream of return air, and a mixed air stream of mixed incoming outside air and return air, wherein the mixed air stream is to be provided to the cooling and/or heating unit of the HVAC system, the economizer unit further including one or more controllable dampers for controlling a mixing ratio of incoming outside air to return air in the mixed air stream, and one or more sensors for sensing one or more sensed parameters of the mixed air stream, the controller unit comprising:
  a controller configured to receive a measure of the one or more sensed parameters sensed by the one or more sensors, and to issue commands to the one or more controllable dampers;
  the controller further configured to:
    issue one or more commands to position the one or more controllable dampers such that the mixed air stream has a first mixing ratio of incoming outside air to return air in the mixed air stream;
    with the mixed air stream having a first mixing ratio, receive a first measure of the one or more sensed parameters sensed by the one or more sensors, and record the first measure of the one or more sensed parameters;
    issue one or more commands to position the one or more controllable dampers such that the mixed air stream has a second mixing ratio of incoming outside air to return air in the mixed air stream;
    with the mixed air stream having a second mixing ratio, receive a second measure of the one or more sensed parameters sensed by the one or more sensors, and record the second measure of the one or more sensed parameters; and
    based at least in part on the recorded first and second measures of the one or more sensed parameters sensed by the one or more sensors, determine whether and/or how much of the incoming outside air to admit into the economizer unit via the one or more controllable dampers during subsequent operation of the HVAC system.

2. The controller unit of claim 1, wherein the one or more sensed parameters sensed by the one or more sensors includes temperature.

3. The controller unit of claim 1, wherein the one or more sensed parameters sensed by the one or more sensors includes humidity.

4. The controller unit of claim 1, wherein the one or more sensed parameters sensed by the one or more sensors includes temperature and humidity.

5. The controller unit of claim 2, wherein the controller is further configured to calculate an outside air temperature of the incoming outside air based at least in part on the recorded first and second measures of the one or more sensed parameters sensed by the one or more sensors.

6. The controller unit of claim 2, wherein the controller is further configured to calculate a return air temperature of the return air based at least in part on the recorded first and second measures of the one or more sensed parameters sensed by the one or more sensors.

7. The controller unit of claim 1, wherein the controller is further configured to calculate at least one of an outside air dew point and an outside air entropy based at least in part on the recorded first and second measures of the one or more sensed parameters sensed by the one or more sensors.

8. The controller unit of claim 1, wherein the controller is further configured to calculate at least one of a return air dew point and a return air entropy based at least in part on the recorded first and second measures of the one or more sensed parameters sensed by the one or more sensors.

9. The controller unit of claim 1, wherein the second mixing ratio is greater than the first mixing ratio.

10. An economizer unit configured to control mixing of an outside air stream with a return air stream to produce a mixed air stream that is provided to a cooling and/or heating unit of an HVAC system, the economizer unit configured to:
   measure one or more parameters of a first mixed air stream while one or more dampers of the economizer unit are disposed in a first damper configuration;
   move the one or more dampers from the first damper configuration to a second damper configuration;
   measure the one or more parameters of a second mixed air stream while the one or more dampers of the economizer unit are disposed in the second damper configuration; and
   based at least in part on the one or more mixed air stream parameters in the first damper configuration and the second damper configuration, determine if outside air usage by the economizer is desirable.

11. The economizer unit of claim 10, wherein the one or more parameters include temperature.

12. The economizer unit of claim 11, wherein the economizer unit determines that outside air usage is desirable if the second mixed air stream has a greater proportion of the outside air stream than the first mixed air stream, and a temperature of the second mixed air stream is less than the temperature of the first mixed air stream by more than a threshold temperature difference, and if not, outside air usage is determined not to be desirable.

13. The economizer unit of claim 10, wherein the one or more parameters include temperature and humidity.

14. The economizer unit of claim 13, wherein the economizer unit calculates a first dew point for the first mixed air stream and calculates a second dew point for the second mixed air stream, and the economizer unit determines that outside air usage is desirable if the second mixed air stream has a greater proportion of the outside air stream than the first mixed air stream, and the second dew point is less than the first dew point by more than a threshold dew point difference, and if not, outside air usage is determined not to be desirable.

15. The economizer unit of claim 13, wherein the economizer unit calculates a first entropy for the first mixed air stream and calculates a second entropy for the second mixed air stream, and the economizer unit determines that outside air usage is desirable if the second mixed air stream has a greater proportion of the outside air stream than the first mixed air stream, and the second entropy is less than the first entropy by more than a threshold entropy difference, and if not, outside air usage is determined not to be desirable.

16. A controller unit for an economizer unit of an HVAC system, wherein the economizer unit is configured to provide an air stream to a cooling and/or heating unit, the economizer unit having an outside air stream of incoming outside air, a return air stream of return air, and a mixed air stream of mixed incoming outside air and return air, wherein the mixed air stream is to be provided to the cooling and/or heating unit of the HVAC system, the economizer unit further including one or more controllable dampers for controlling a mixing ratio of incoming outside air to return air in the mixed air stream, and one or more sensors for sensing one or more sensed parameters of the mixed air stream, the controller unit comprising:
   a controller configured to receive a measure of the one or more sensed parameters sensed by the one or more sensors, and to issue commands to the one or more controllable dampers;
   the controller further configured to:
      issue one or more commands to position the one or more controllable dampers such that the mixed air stream includes substantially all incoming outside air and substantially no return air;
      receive a first measure of the one or more sensed parameters sensed by the one or more sensors, and record the first measure of the one or more sensed parameters sensed by the one or more sensors; and
      based at least in part at least in part on the recorded first measure of the one or more sensed parameters sensed by the one or more sensors, determine whether and/or how much of the incoming outside air to admit into the economizer unit via the one or more controllable dampers during subsequent operation of the HVAC system.

17. The controller unit of claim 16, wherein the controller further configured to:
   issue one or more commands to position the one or more controllable dampers such that the mixed air stream includes substantially all return air and substantially no incoming outside air;
   receive a second measure of the one or more sensed parameters sensed by the one or more sensors, and record the second measure of the one or more sensed parameters sensed by the one or more sensors; and
   based at least in part on the recorded first and second measures of the one or more sensed parameters sensed by the one or more sensors, determine whether and/or how much of the incoming outside air to admit into the economizer via the one or more controllable dampers during subsequent operation of the HVAC system.

18. The controller unit of claim 16, wherein the one or more sensed parameters sensed by the one or more sensors includes temperature.

19. The controller unit of claim 16, wherein the one or more sensed parameters sensed by the one or more sensors includes humidity.

20. The controller unit of claim 16, wherein the one or more sensed parameters sensed by the one or more sensors includes temperature and humidity.

* * * * *